M. N. ANDERSON.
LOCKING COUPLING.
APPLICATION FILED MAR. 29, 1916.

1,254,386.

Patented Jan. 22, 1918.

WITNESSES

INVENTOR
Mark Neil Anderson.
BY
ATTORNEY

UNITED STATES PATENT OFFICE.

MARK NEIL ANDERSON, OF SHERBURN, MINNESOTA.

LOCKING-COUPLING.

1,254,386.

Specification of Letters Patent.  Patented Jan. 22, 1918.

Application filed March 29, 1916. Serial No. 87,534.

*To all whom it may concern:*

Be it known that I, MARK NEIL ANDERSON, a citizen of the United States, residing at Sherburn, in the county of Martin and State of Minnesota, have invented certain new and useful Improvements in Locking-Couplings, of which the following is a specification.

My invention relates to a locking and coupling device.

At the present time, the anti-skid chains used in connection with automobile or other vehicle tires are usually fastened in place by means of hooks which are unsatisfactory since the hooks often become detached.

The present invention has been especially devised with a view to providing a simple, inexpensive and efficient locking and coupling device to be used in lieu of the said hooks so as to overcome the objections incidental to the use of the hooks, and especially so as to overcome danger of detachment of the hooks.

A further object is to provide a locking device having a retaining hook, a lock member therefor, and a slidable, spring-pressed bolt operable to permit and to prevent movement of the lock member.

With the above, and additional objects, such as will hereinafter appear, the invention has been embodied in one preferred form as illustrated in accompanying drawings and described hereinafter.

In said drawings:—

Figure 1:
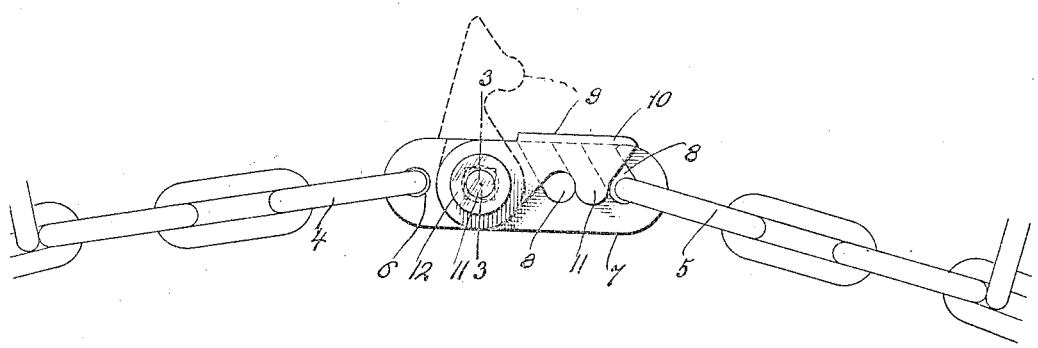
Figure 1 is a view illustrating my improved device in connection with fragments of an antiskid chain.
Figure 2:
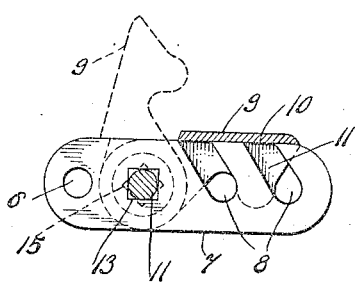
Fig. 2 is a view showing the hook member in side elevation and the lock member and bolt in vertical section.
Figure 3:
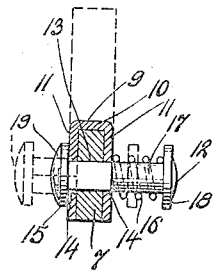
Fig. 3 is a vertical sectional view taken substantially on the line 3—3 of Fig. 1.

Referring specifically to the drawings, wherein like reference characters designate like or similar parts, sections of an anti-skid attachment for pneumatic or other vehicle tires, composed of chain sections, is shown of which 4 and 5 are opposed links. The link 4 extends loosely through an opening 6 of an elongated hook member 7 provided with one or more receiving openings 8. Movable relatively to the hook member 7, is a lock member 9 having a closure portion 10, to close the entrance to the openings 8 and from which portion 10 sides 11 depend, and embrace the hook member 7 on opposite sides. A bolt 12 is slidable through square openings, one at 13 through the hook member 7 and at least one at 14 through one of the sides 11. Preferably but not necessarily, the other side wall 11 is provided with a square opening 14. The bolt 12 has a squared portion 15 adapted to normally occupy the space of the openings 13 and 14 and being urged into such position by means of an expansion spring 16 surrounding a round portion 17 of the bolt and abutting one side wall 11 and a head or abutment 18 at one end of the bolt. A head or abutment 19 is provided at the other end of the bolt and adapted to engage the other wall 11 to limit the sliding movement of the bolt.

In use, one chain section is adapted to be connected to the hook 7 by passage of the link 4 thereof through the opening at 6. Another section of the chain, has its link 5 fastened in either opening 8 and according to the tension desired for the chain. Then with the round portion 11 occupying the space of openings 13 and 14, the lock 9 is swung downwardly so as to close the entrance to openings 8 as shown in full lines in the drawings in order to fasten the link 5 against detachment. When said full line position of the lock is assumed, the spring 16 urges movement of the bolt 12 which disposes the squared portion 15 in the openings 13 and 14 and as a result the lock 9 is incapable of movement relatively to the hook 7. However, in order to release the lock 9, the bolt 12 is manually pushed against the tension of the spring 16 through engagement of a finger with the head 18 until the round portion 17 occupies the space of openings 13 and 14 whereupon the lock may be swung to the dotted line position of the drawings, when the link 5 may be detached from the hook.

I do not limit myself to the provision of a squared portion 15, since any suitably shaped portion may be utilized which will not permit relative turning movement of the hook and lock. Also other details of construction may be varied within the spirit and scope of the appended claims.

I claim:

1. A locking device having lock members, one member being movable relatively to the other member, a pivot bolt associated with said members and longitudinally slidable therethrough, said bolt having a non-cylindrical portion to normally secure said members against relative movement and having another portion cylindrical in cross section movable with the bolt into operative relation with the said members to permit relative movement therebetween, and resilient means to hold the bolt in its locked position.

2. A locking device having locking members, one member being movable relatively to the other member, a transverse pivot bolt associated with said members and longitudinally slidable, said bolt having a head on each end, a cylindrical portion at one end, serving as a pivot for said members, and a polygonal portion at the opposite end to serve as a lock to prevent relative movement of said members, and resilient means to normally maintain one of said portions into cooperating relation with the pivot openings of said members.

3. A locking device having a lock member provided with a receiving opening, a second lock member pivoted to and movable relatively to said first lock member and having a portion to close the mouth of said receiving opening, sides depending from said portion and having each an opening registering with said receiving opening, a bolt forming a lock pivot for said members slidable longitudinally through polygonal pivot holes in said lock members, one end of said bolt fitting said openings to prevent relative movement of said members, the other end of said bolt being cylindrical in cross section and forming a pivot of said members, a head on each end of said bolt, and a spring surrounding the bolt between one of said heads and the adjacent lock member.

4. A locking device comprising a lock member having a transverse opening for securing an article thereto and a square opening for a pivot pin, a second lock member of U-shape in cross section adapted to engage over the edge of the first lock member and having notches registering with its first named opening and also having similarly shaped pivot openings, a pivot pin passing through the pivot opening in both of said members and projecting beyond one side thereof, one portion of said pin being of similar shape to the pivot openings and adapted to prevent relative movement therebetween, the other portion of the pin being cylindrical and serving as a pivot for the two members to operate, a head on each end of said pin, and a spring surrounding the pin between one of said heads and the adjacent side of the locking device.

In testimony whereof I affix my signature in presence of two witnesses.

MARK NEIL ANDERSON.

Witnesses:
R. E. PADING,
C. R. LUNGREN.